US012808664B2

(12) United States Patent
Thimirachandra et al.

(10) Patent No.: US 12,808,664 B2
(45) Date of Patent: Nov. 24, 2026

(54) SYSTEM AND METHOD FOR DIMENSIONING OBJECTS

(71) Applicant: ZEBRA TECHNOLOGIES CORPORATION, Lincolnshire, IL (US)

(72) Inventors: Sanjeewa Thimirachandra, Kotugoda (LK); Raghavendra Tenkasi Shankar, Holbrook, NY (US); Ruth Zhang, Hauppauge, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 320 days.

(21) Appl. No.: 18/601,597

(22) Filed: Mar. 11, 2024

(65) Prior Publication Data

US 2025/0283716 A1 Sep. 11, 2025

(51) Int. Cl.

*B81B 7/00* (2006.01)
*G01B 21/02* (2006.01)
*G01B 21/18* (2006.01)
*G01L 9/00* (2006.01)

(52) U.S. Cl.

CPC ............. *G01B 21/18* (2013.01); *G01B 21/02* (2013.01)

(58) Field of Classification Search

CPC ....... G01B 11/00; G01B 11/22; G01B 11/022; G01B 11/02; G01B 21/18; G01B 11/026; G06T 7/001; G06T 7/521; G06T 19/00; G06T 7/593; G06T 7/50; G06T 7/60; G06T 7/0002; G06T 17/00; G06T 7/74; G06T 7/80; G06T 7/62; G06T 7/20; G06T 7/73; G06T 7/13; G06T 7/12; G06T 19/006; G06T 7/149; G06T 7/0004; G06T 7/11; G06V 10/145; G06V 20/10; G06V 20/64; H04N 17/002; G01S 17/894; G01S 17/89; G01S 17/42; G06K 19/06009; G06K 9/209; G06K 9/00664; G06F 18/2137; G06F 16/5854; G06F 3/0346; G06F 16/5866; G06F 3/011; G06F 3/04815; G06F 17/50; G06Q 10/0832; G05D 1/0214; G01C 15/002

See application file for complete search history.

(56) References Cited

U.S. PATENT DOCUMENTS

2023/0025659 A1* 1/2023 Thrimawithana ....... G06T 7/521

* cited by examiner

*Primary Examiner* — Brandi N Hopkins

(57) ABSTRACT

An example dimensioning device includes: a depth sensor configured to obtain depth data within a field of view; a processor interconnected with the depth sensor, the processor configured to: obtain depth data within the field of view including an object to be dimensioned; obtain a subset of the depth data from a predefined target region within the field of view; select a dimensioning function for the object, the dimensioning function having a target orientation of the object; validate the target orientation of the object based on the subset of the depth data in the predefined target region; and when the target orientation is validated, apply the dimensioning function to obtain dimensions of the object.

16 Claims, 7 Drawing Sheets

SYSTEM AND METHOD FOR DIMENSIONING OBJECTS

BACKGROUND

Determining the dimensions of objects may be necessary in a wide variety of applications. For example, it may be desirable to determine the dimensions of freight, parcels, packages in a warehouse prior to shipping or storage. Different shapes and sizes of objects may be optimally dimensioned by different dimensioning functions. Small objects may be difficult to dimension as their size may cause increased distance from the dimensioning device if the user is standing while the object is on the floor, and therefore decreased resolution and accuracy in dimensioning.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
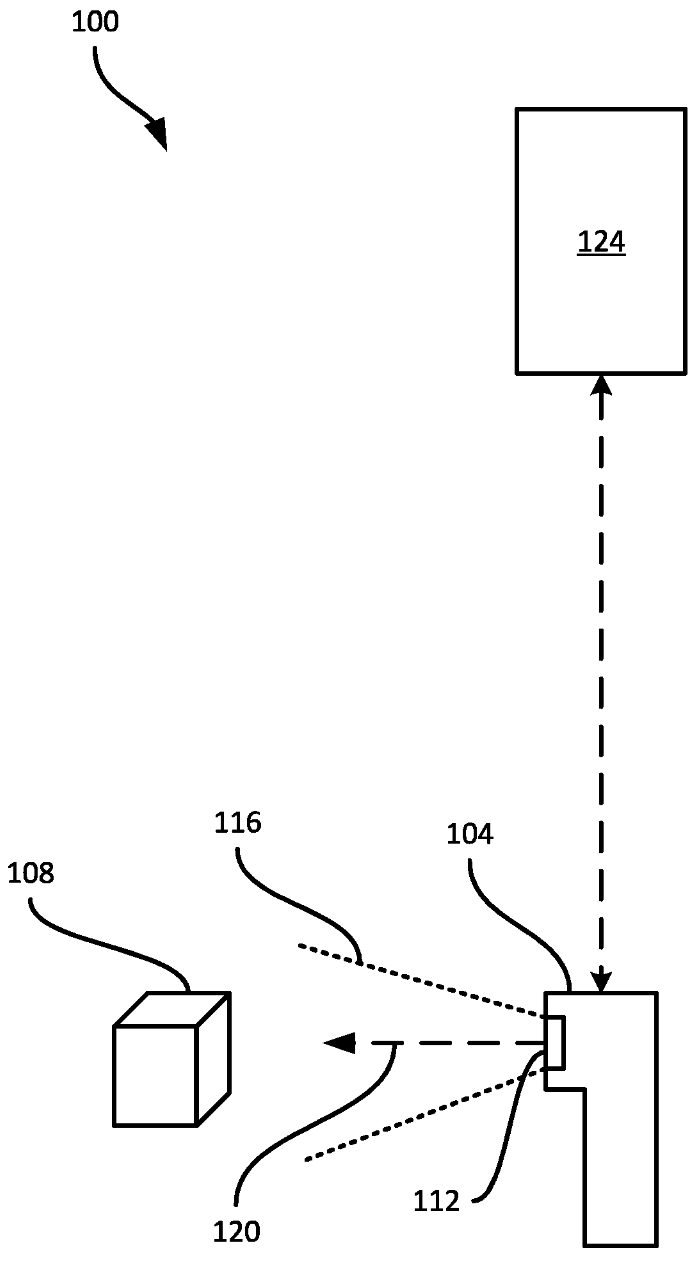
FIG. 1 is a schematic diagram of a system for dimensioning objects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a dimensioning device comprising: a depth sensor configured to obtain depth data within a field of view; a processor interconnected with the depth sensor, the processor configured to: obtain depth data within the field of view including an object to be dimensioned; obtain a subset of the depth data from a predefined target region within the field of view; select a dimensioning function for the object, the dimensioning function having a target orientation of the object; validate the target orientation of the object based on the subset of the depth data in the predefined target region; and when the target orientation is validated, apply the dimensioning function to obtain dimensions of the object.

Additional examples disclosed herein are directed to a method comprising: obtaining depth data from a field of view including an object to be dimensioned; obtaining a subset of the depth data from a predefined target region within the field of view; selecting a dimensioning function for the object, the dimensioning function having a target orientation of the object; validating the target orientation of the object based on the subset of the depth data in the predefined target region; and when the target orientation is validated, applying the dimensioning function to obtain dimensions of the object.

Additional examples disclosed herein are directed to a non-transitory computer-readable storage medium storing instructions thereon, which when executed configure a processor to: obtain depth data within a field of view including an object to be dimensioned; obtain a subset of the depth data from a predefined target region within the field of view; select a dimensioning function for the object, the dimensioning function having a target orientation of the object; validate the target orientation of the object based on the subset of the depth data in the predefined target region; and when the target orientation is validated, apply the dimensioning function to obtain dimensions of the object.

FIG. 1 depicts a system 100 for dimensioning objects in accordance with the teachings of this disclosure. The system 100 includes a computing device 104 (also referred to herein as the dimensioning device 104 or simply the device 104) configured to dimension a target object 108 according to a selected dimensioning function. For example, the object 108 may be an item, such as a box or package, in a transport and logistics facility. Preferably, the target object 108 may be substantially cuboidal in shape.

The device 104 may be a mobile computing device, such as a mobile phone, a tablet, a barcode scanner, a dedicated dimensioning device, or the like. In such examples, the device 104 may include a depth sensor 112, a set of depth sensors, or one or more additional sensors such as image sensors (e.g., optical cameras, infrared sensors, etc.), ambient light sensors, proximity sensors, temperature sensors, and the like to capture dimensioning data representing the object 108. In other examples, the device 104 may be a fixed computing device such as a desktop computer, a kiosk, or the like, and the device 104 may be associated with the depth sensor 112 to obtain data from the sensor 112 to dimension the object 108.

In particular the depth sensor 112 may have a field of view 116 for which the depth sensor 112 is able to capture depth data. As described herein, the device 104 may capture preliminary depth data from the field of view 116, and then process the preliminary depth data, in particular from a predefined target region of the field of view 116, for the dimensioning operation. The depth sensor 112 may further have a principal axis 120 substantially perpendicular to a plane of the depth sensor 112.

The device 104 may be in communication with a server 124 via a communication link, illustrated in the present example as including wireless links. For example, the link may be provided by a wireless local area network (WLAN) deployed by one or more access points (not shown). In other examples, the server 124 is located remotely from the device 104 and the link may therefore include one or more wide-area networks such as the Internet, mobile networks, and the like. The server 124 may be any suitable server environment, including a plurality of cooperating servers operating, for example in a cloud-based environment.

The system 100 is generally deployed to dimension target objects, such as the object 108. In particular, the dimensioning device 104 is configured to dimension substantially cuboidal target objects 108, and further, target objects 108 which are generally sufficiently small so as to be held in the hand by a user. Small objects may typically be difficult for typical dimensioning operations which rely on reference surfaces such as the floor, a table, or other support surface, since dimensioning device may not have sufficient resolution at a normal operating distance to accurately assess the dimensions of the small object. Accordingly, as described herein, the dimensioning device 104 is configured to allow a user to hold the target object 108 and performs a dimensioning operation on a small object. For example, the dimensioning device 104 is configured to obtain preliminary depth data from the field of view 116 of the depth sensor 112, where the target object 108 is in the field of view 116. The dimensioning device 104 may select a dimensioning function and validate a target orientation of the object 108 for the selected dimensioning function using a subset of the preliminary depth data corresponding to a predefined target region of the field of view 116. The dimensioning device 104 may facilitate alignment in the target orientation when the target orientation is perpendicular to the principal axis 120 by displaying an alignment indicator on the device 104.

Figure 2:
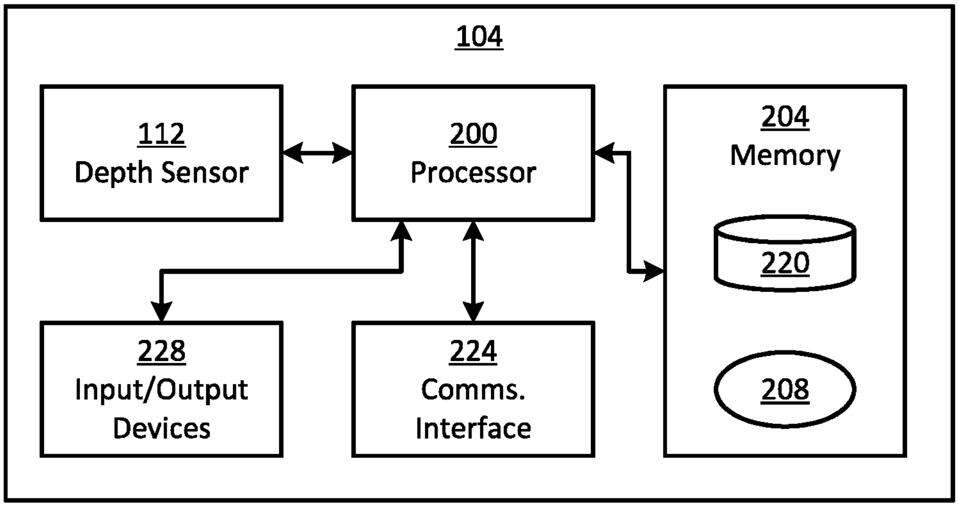
FIG. 2 is a block diagram of certain internal hardware components of the detection device of FIG. 1.

Turning now to FIG. 2, certain internal components of the dimensioning device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor, configures the processor 200 to perform various functions discussed below in greater detail and related to the dimensioning operation of the device 104. Some or all of the application 208 may also be implemented as a suite of distinct applications.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein. The memory 204 also stores a repository 220 storing rules and data for the dimensioning operation.

The device 104 also includes a communications interface 224 enabling the device 104 to exchange data with other computing devices such as the server 124. The communications interface 224 is interconnected with the processor 200 and includes suitable hardware (e.g., transmitters, receivers, network interface controllers and the like) allowing the device 104 to communicate with other computing devices-such as the server 124. The specific components of the communications interface 224 are selected based on the type of network or other links that the device 104 is to communicate over.

The device 104 may further include one or more input and/or output devices 228. The input devices may include one or more buttons, keypads, touch-sensitive display screens or the like for receiving input from a user. The output devices may further include one or more display screens, sound generators, vibrators, or the like for providing output or feedback to a user.

Figure 3:
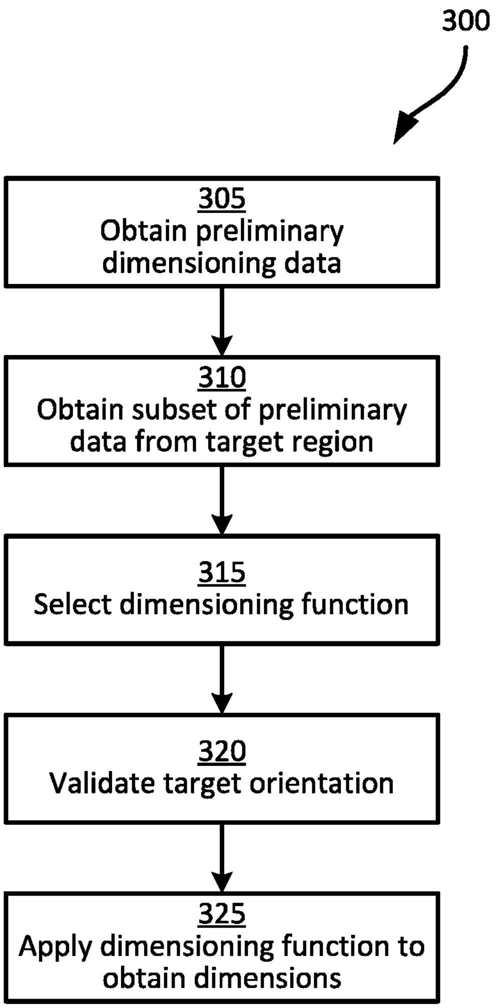
FIG. 3 is a flowchart of a method for dimensioning objects.

Turning now to FIG. 3, the functionality implemented by the device 104 will be discussed in greater detail. FIG. 3 illustrates a method 300 of dimensioning a target object. The method 300 will be discussed in conjunction with its performance in the system 100, and particularly by the device 104, via execution of the application 208. In particular, the method 300 will be described with reference to the components of FIGS. 1 and 2. In other examples, some or all of the method 300 may be performed by other suitable devices or systems, such as the server 124.

The method 300 is initiated at block 305, where the device 104 obtains preliminary dimensioning data, and in particular, preliminary depth data from the field of view 116 of the depth sensor 112. In particular, the field of view 116 may include the target object 108 to be dimensioned. For example, the device 104 may control the depth sensor 112 to capture the preliminary depth data from its field of view in response to a trigger from a user or in response to detecting a dimensioning condition. For example, the device 104 may process the depth data in the field of view and identify the dimensioning condition when an object 108, or in particular, a cuboidal object 108, is detected. In some examples, in addition to preliminary depth data, the device 104 may obtain additional preliminary dimensioning data, such as image data (e.g., optical image data, infrared data, or the like), other environmental data detected by additional sensors during the dimensioning operation, or the like.

In some examples, at block 305, prior to obtaining the preliminary depth data, the device 104 may output, at the output device 228, instructions for obtaining the preliminary depth data. For example, the device 104 may display text instructions and/or visual guidelines or produce an audio signal to prompt the user to orient the device 104 towards the target object 108, such that the target object 108 is in the field of view 116 of the depth sensor 112.

In particular, to facilitate the dimensioning operation described herein, the device 104 may display the field of view (e.g., as captured by an image sensor of the device 104) with a region indicator of a predefined target region within that field of view 116. The predefined target region represents a portion of the field of view 116 from which a subset of the preliminary depth data is to be extracted and validated for the dimensioning operation, as will be described herein. The predefined target region may be about centered in the field of view 116, and may be substantially circular, rectangular, or have another suitable shape. The region indicator may therefore outline a boundary of the predefined target region to allow the user to visualize the predefined target region within the field of view 116 and align the target object 108 within the field of view 116 based on the region indicator.

At block 310, the device 104 is configured to obtain a subset of the preliminary depth data from the predefined target region of the field of view 116. For example, the device 104 may extract the depth data from pixels in the field of view 116 corresponding to the predefined target region.

At block 315, the device 104 is configured to select a dimensioning function for the target object 108. For example, the device 104 may select the dimensioning function based on the subset of preliminary depth data obtained at block 310. In particular, the device 104 may be configured to identify or detect a geometrical element or feature (e.g., a vertex, an edge, a face, or the like) present in the subset of preliminary depth data an select the dimensioning function based on the detected geometrical element. For example, the device 104 may use one or more plane fitting functions, RGB (red-green-blue) and/or infrared-assisted boundary detection, and the like. The device 104 may further apply hand detection, point elimination, artificial depth hole filling functions to remove a hand of the user. Further, in some examples, the device 104 may apply detection functions to the preliminary dimensioning data from the entire field of view 116, while applying the selection and validation criteria to the subset of preliminary depth data from the predefined target region.

In other examples, the device 104 may select the dimensioning function based on a selection input from the user of the device 104. The dimensioning functions may include a perpendicular-face approach, a two-sided perspective approach, a three-sided perspective approach, or similar. That is, the dimensioning function may vary by a target orientation of the object 108 to be dimensioned. Accordingly, in addition to selecting a dimensioning function for the target object 108, the device 104 may additionally identify a target orientation for the target object 108 to allow the target object 108 to be successfully dimensioned using the selected dimensioning function.

At block 320, the device 104 is configured to validate that the target object 108 is in the target orientation using the subset of the preliminary depth data obtained at block 310. For example, the device 104 may analyze the subset of the preliminary depth data to identify geometrical elements or features of the target object 108 and verify that appropriate geometrical elements are present according to the target orientation.

Figure 4:
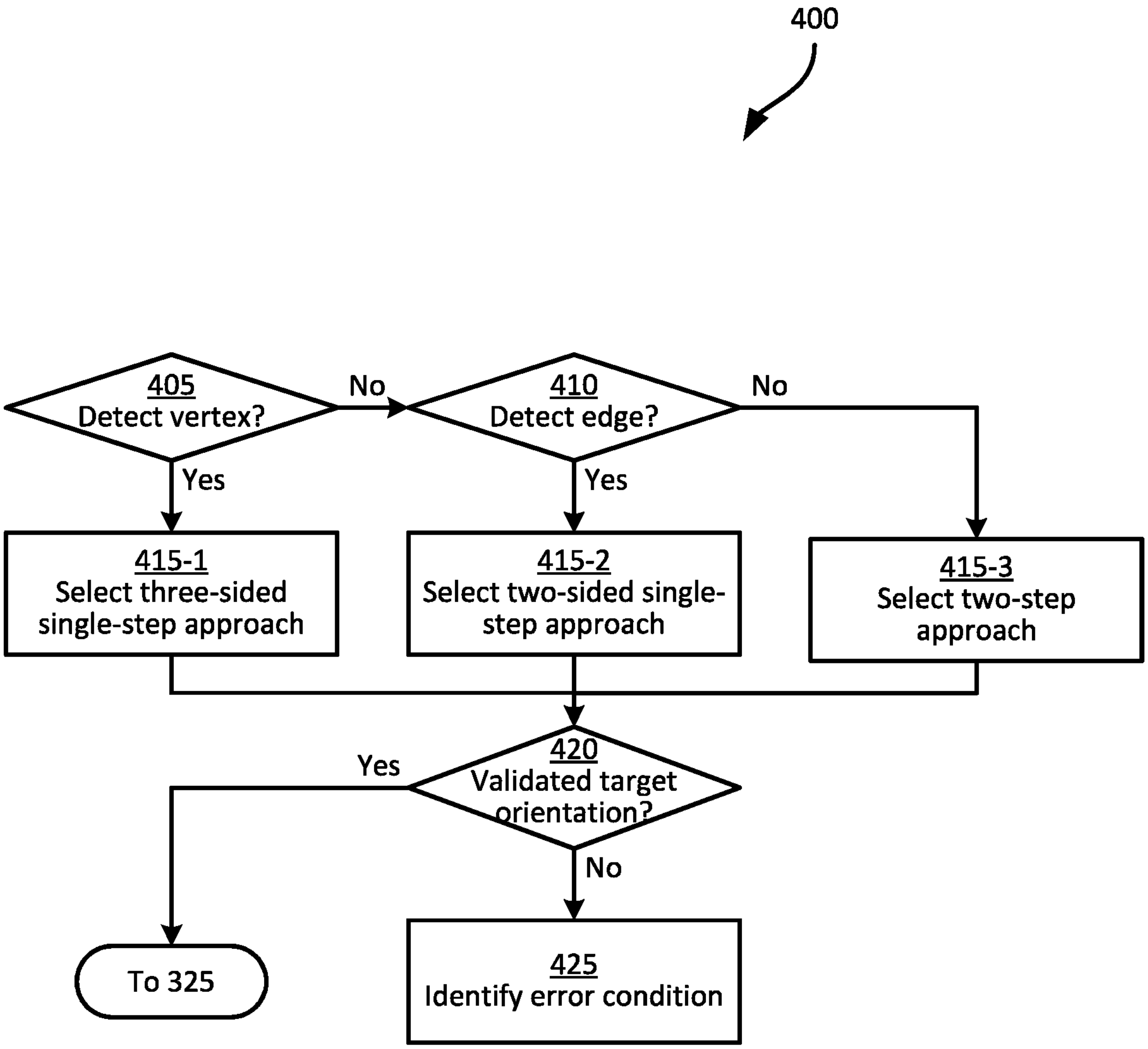
FIG. 4 is a flowchart of an example method for selecting a dimensioning function and validating the target orientation at block 320 of the method of FIG. 3.

For example, referring to FIG. 4, a flowchart of an example method 400 of selecting a dimensioning function and validating the target orientation for the dimensioning function is depicted.

At block 405, the device 104 determines whether a vertex is detected in the subset of the preliminary depth data. For example, the device 104 may use any suitable functions configured to analyze depth data and identify geometric features, including vertices and/or corners of objects.

If the determination at block 405 is affirmative, the device 104 proceeds to block 415-1. At block 415-1, the device 104 is configured to select the three-sided perspective approach as the dimensioning function. That is, having identified a vertex in the predefined target region, the device 104 may assume that a user has or is orienting the target object 108 to allow the device 104 to have a view of the target object 108 in which three of the faces are visible in the field of view 116.

Accordingly, at block 420, the device 104 is configured to validate the target orientation for the selected three-sided perspective approach. In particular, for the three-sided perspective approach, the device 104 may verify that in addition to a vertex, three distinct faces are detectable in the predefined target region. That is, the target orientation is a perspective view including three sides of the object. The device 104 may further validate that the three distinct faces are oriented substantially perpendicular to one another. If the device 104 validates that the target object 108 achieves the target orientation for the three-sided perspective approach, the device 104 may proceed to block 325 of the method 300.

Figure 5A:
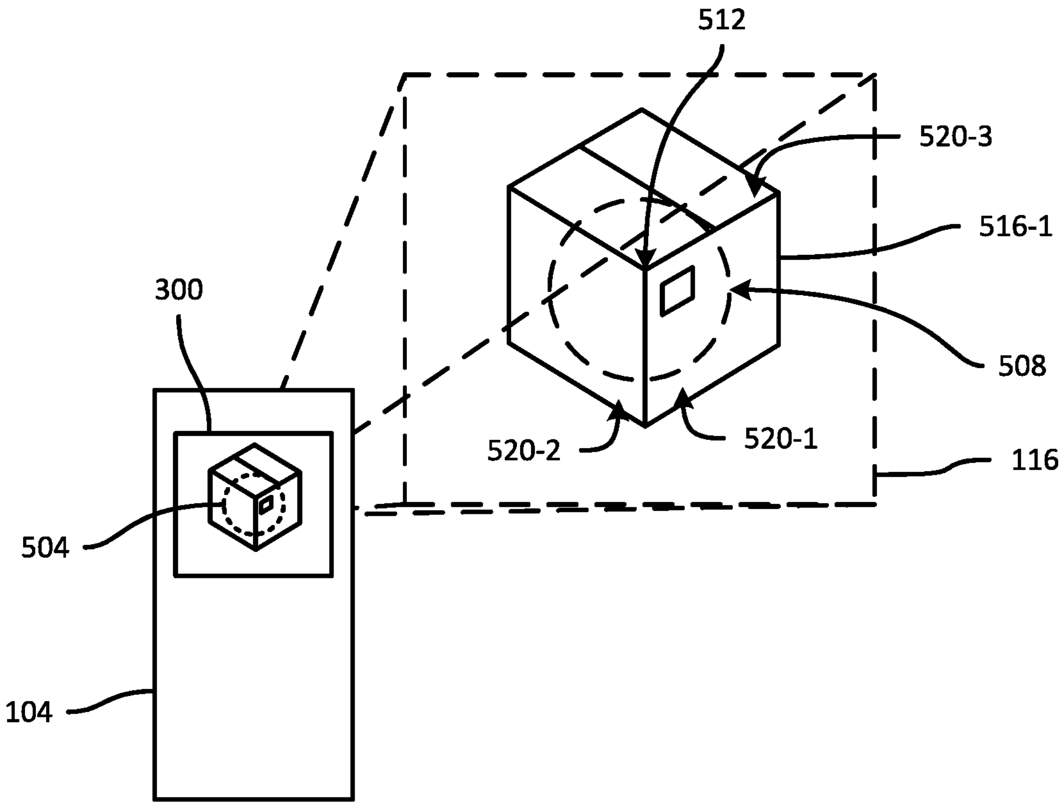
FIG. 5A is a schematic diagram of a performance of block 405 of the method of FIG. 4.

Thus, for example referring to FIG. 5A, the dimensioning device 104 is depicted with a display 500 configured to display a representation of the field of view 116. The display 500 may further be configured to display a region indicator 504 representing the predefined target region 508. Accordingly, in operation, at block 405-1, the dimensioning device 104 may detect a vertex 512 of an object 516-1 in the preliminary depth data corresponding to the predefined target region 508. At block 420, the dimensioning device 104 may further verify that three distinct faces 520-1, 520-2, and 520-3 are detected in the preliminary depth data corresponding to the predefined target region 508. The device 104 may then validate that the target orientation for the three-sided perspective approach as the dimensioning function has been achieved, and may proceed to block 325 of the method 300.

Returning to FIG. 4, if the determination at block 405 is negative, the device 104 proceeds to block 410. At block 410, the device 104 determines whether an edge is detected in the subset of preliminary depth data. Further, the device 104 may determine whether the edge extends across the predefined target region, from one point on the perimeter of the predefined target region to another point on the perimeter of the predefined target region (e.g., the edge represents a chord or segment extending across the predefined target region).

If the determination at block 410 is affirmative, the device 104 proceeds to block 415-2. At block 415-2, the device 104 is configured to select the two-sided perspective approach as the dimensioning function. That is, having identified an edge in the predefined target region, the device 104 may assume that a user has or is orienting the target object 108 to allow the device 104 to have a view of the target object 108 in which two of the faces are visible in the field of view 116. In particular, in the target orientation, the object 108 may be oriented in such a way that only two of the faces are visible in the field of view 116.

Accordingly, at block 420, the device 104 is configured to validate the target orientation for the selected two-sided perspective approach. In particular, for the two-sided perspective approach, the device 104 may verify that in addition to an edge, two distinct faces are detectable in the predefined target region. That is, the target orientation is a perspective view including two sides of the object. The device 104 may further validate that the two distinct faces are oriented substantially perpendicular to one another. If the device 104 validates that the target object 108 achieves the target orientation for the two-sided perspective approach, the device 104 may proceed to block 325 of the method 300.

Figure 5B:
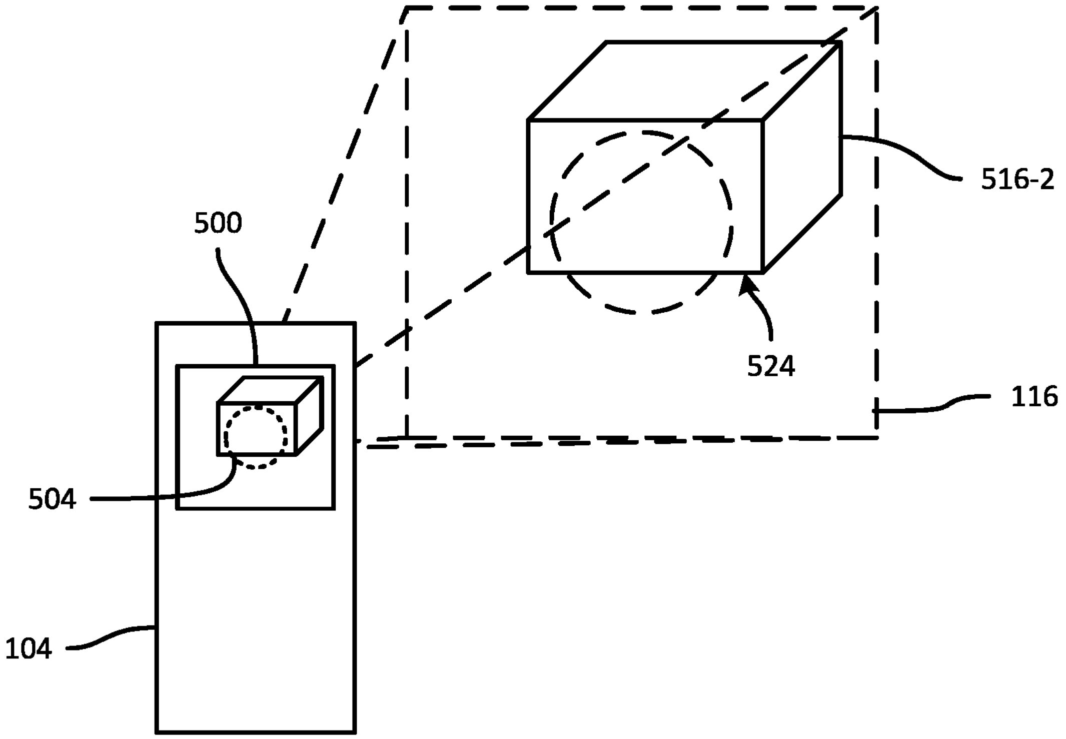
FIG. 5B is a schematic diagram of a performance of block 410 of the method of FIG. 4.

For example, referring to FIG. 5B, the dimensioning device 104 is depicted dimensioning an object 516-2. In this example, at block 405-1, the dimensioning device 104 may not detect a vertex, and at block 405-2, the dimensioning device 104 may detect an edge 524 of the object 516-2 in the preliminary depth data corresponding to the predefined target region 508. However, based on the orientation of the object 516-2, only one face of the object 516-2 may be detected in the preliminary depth data corresponding to the predefined target region 508. That is, while the edge 524 may extend on one side to a face of the object 516-2, the edge 524 may represent a boundary between the face and an environment of the object 516-2 visible in a background of the field of view 116. Accordingly, the validation at block 420 may fail.

Returning again to FIG. 4, if the determination at block 410 is negative, the device 104 may proceed to block 415-3. At block 415-3, the device 104 is configured to select the perpendicular-face approach. That is, the device 104 may assume that a user has or is orienting the target object 108 to dimension one face of the target object 108 at a time.

Accordingly, at block 420, the device 104 may validate the target orientation for the selected perpendicular-face approach. In particular, for the perpendicular-face approach, the device 104 may validate that the single face or surface is detected in the predefined target region, and in some examples, whether an average depth of the single face or surface is within a threshold distance of the device 104, for example to verify that the target object 108 is sufficiently close to dimension. In some examples, the device 104 may additionally validate an orientation angle of the target object 108 as described below in conjunction with the perpendicular-face dimensioning operation. For example, block 420 may be integrated into the performance of the method 600 as described below. If the device 104 validates that the target object 108 achieves the target orientation for the perpendicular-face approach, the device 104 may proceed to block 325 of the method 300.

If the validation block 420 fails, then the device 104 may identify an error condition at block 425. In some examples, the device 104 may generate an error condition alert, such as a visual indication (e.g., at an indicator light, a display screen or the like), an audio indication, a notification, or similar. Alternately, the device 104 may simply wait for the object to be repositioned to a valid orientation for the selected dimensioning function or for another dimensioning function.

Returning to FIG. 3, in some examples, in addition to validating the target orientation of the object 108 at block 320, the device 104 may perform other validations. For example, the device 104 may validate that the target object 108 occupies a threshold proportion of the field of view 116. The device 104 may further validate that an entirety of the target object 108 is visible in the field of view. For example, the device 104 may validate that a boundary of the target object 108 does not coincide with the boundary of the frame of view 116.

At block 325, the device 104 is configured to apply the selected dimensioning function to dimension the target object. In some examples, the device 104 may obtain further dimensioning data, for example by controlling the depth sensor 112 and/or any other additional sensors to capture data from the field of view 116. In particular, since the method 300 may particularly be applied to hand-held and/or small objects 108, the device 104 may first segment the captured data to identify the object to be dimensioned. The device 104 may assume that the object 108 remains substantially covering the predefined target region, and hence may discard the dimensioning data not identified as being part of the object 108 originating in the predefined target region. That is, the dimensioning function may be configured to be applied using the segment representing the target object only, rather than being based on relative support surfaces such as a floor, table, or the like. As a result, the device 104 may discard the segments of the depth data having depth values only outside the predefined target region, which may represent, for example, the environment of the object including any detected support surfaces, other objects, or the like. Thus, when the object 108 is handheld, the device 104 may be enabled to detect and dimensions objects 108 which are substantially flat, such as letters or envelopes, since the handheld nature of the object 108 allows the boundaries of the substantially flat objects to be distinguished from other substantially planar surfaces, such as the floor or other support surfaces.

The device 104 may further apply one or more hand detection and point elimination functions, as well as hole filling functions to eliminate depth data from a user's hand holding the object 108.

The device 104 may then apply the selected dimensioning function to determine dimensions of the object 108. For the three-sided and two-sided perspective approaches, all three dimensions (i.e., length, width and height) of the cuboidal object 108 are captured in the field of view when the object 108 is in the target orientation, and hence the device 104 may simply use the obtained depth data to determine the dimensions of the object 108.

Figure 6:
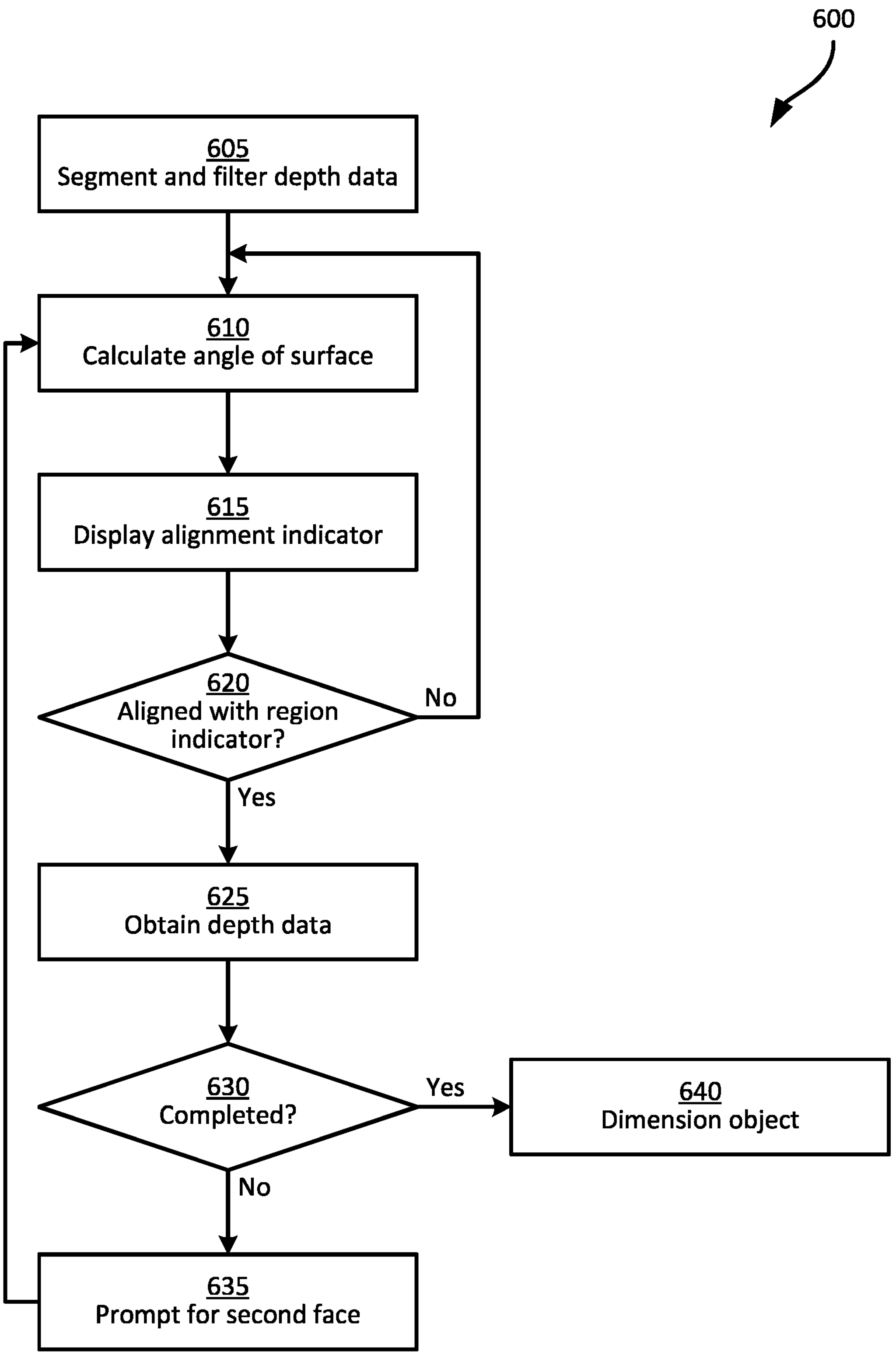
FIG. 6 is a flowchart of an example method of applying a dimensioning function using a perpendicular-face approach at block 325 of the method of FIG. 3.

In the perpendicular-face approach, the device 104 may be configured to obtain first depth data of a first surface when the first surface is perpendicular to the principal axis and second depth data of a second surface when the second surface is perpendicular to the principal axis. That is, two dimensions may be detectable in the field of view 116 in the first step when the first surface is perpendicular to the principal axis and a different set of two dimensions may be detectable in the field of view 116 at the second step when the second surface is perpendicular to the principal axis. Accordingly, the device 104 may prompt the user to move the target object 108 to allow a different surface to be visible. Further, surface may be easier to dimension when the surface is substantially perpendicular to the principal axis 120 of the depth sensor 112, and hence the device 104 may facilitate alignment of the target object 108 to be substantially perpendicular to the principal axis 120 of the depth sensor 112. For example, referring to FIG. 6, an example method 600 of applying a perpendicular-face approach dimensioning function is depicted.

At block 605, the device 104 may obtain, segment and filter dimensioning data, and in particular, depth data, from the field of view 116. In particular, the device 104 may segment and filter the depth data to retain the surface from the predefined target region. The device 104 may similarly apply hand detection, point elimination and hole filling functions to remove a user's hand from the dimensioning data.

At block 610, the device 104 determines an angle of the surface relative to the principal axis 120 of the depth sensor 112. For example, the device 104 may apply plane fitting and determine a surface normal of the surface, and then compute the relative angle of the surface normal to the principal axis 120. In other examples, the device 104 may identify the four vertices of the surface (i.e., assuming a cuboidal object 108) and use the respective depths to determine the angle of the surface. In other examples, the device 104 may employ one or more edge detection, plane fitting or other suitable functions to facilitate the computation of the angle of the surface relative to the principal axis 120 of the depth sensor 112.

At block 615, the device 104 is configured to display an alignment indicator based on the angle of the surface computed at block 610. In particular, the alignment indicator may be displayed on a display of the device 104. The alignment indicator may be positioned relative to the region indicator according to the angle of the surface, such that when the surface is perpendicular to the principal axis 120 of the depth sensor 112, the alignment indicator is centralized in the region indicator for the predefined target region. When the surface normal of the detected surface has an angular offset from the principal axis 120, the alignment indicator may be similarly offset from the region indicator in the direction of the angle offset. Thus, for example, the alignment indicator may have a shape complementary to that of the region indicator.

Figure 7A:
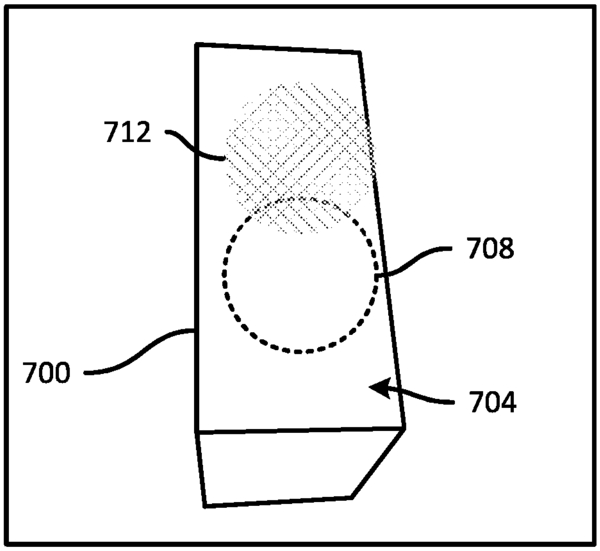
FIGS. 7A and 7B are schematic diagrams of aligning an alignment indicator with a region indicator at block 620 of the method of FIG. 6.

For example, referring to FIG. 7A, the device 104 displays the field of view 116 with an object 700 having a surface 704 oriented at an angle to the principal axis 120 of the depth sensor 112. Upon detecting in the predefined target region, as indicated by a region indicator 708, that the surface 704 is detected, the device 104 may compute the angle of the surface 704 and additionally display an alignment indicator 712, which is misaligned with the region indicator 708 to indicate the misalignment of the surface 704 relative to the principal axis 120. For example, the alignment indicator 712 may be skewed towards a portion of the surface 704 which is further away from the depth sensor 112.

Figure 7B:
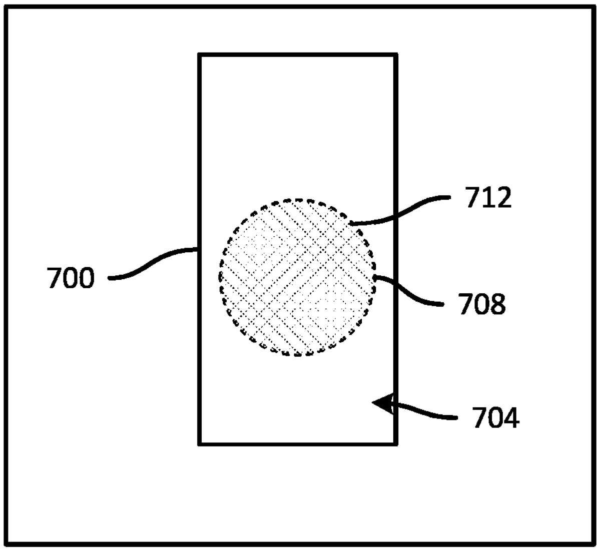

In FIG. 7B, a user may adjust the position of the object 700 to be substantially perpendicular to the principal axis 120, and accordingly the alignment indicator 712 is aligned with the region indicator 708.

Returning to FIG. 6, at block 620, the device 104 determines whether the alignment indicator is aligned with the region indicator. In some examples, the determination at block 620 may be performed automatically by the device 104, while in other examples, the determination at block 620 may be performed with input from the user of the device 104. If the determination at block 620 is negative, then the device 104 may continue to periodically calculate the angle of the surface, update the display of the alignment indicator and wait until the alignment indicator is aligned with the region indicator.

If the determination at block 620 is affirmative, the device 104 may proceed to block 625. At block 625, the device 104 may be configured to obtain dimensioning data, for example including depth data, image data, or the like. In particular, upon detecting alignment of the alignment indicator with the region indicator, the device 104 may control the depth sensor 112 (and any further sensors of the device 104) to capture dimensioning data while the target object 108 is oriented perpendicular to the depth sensor 112. The device 104 may be controlled to capture the dimensioning data automatically or in response to an input from the user.

At block 630, the device 104 determines whether sufficient dimensioning data from the perpendicular faces has been obtained to allow the device 104 to complete the dimensioning operation. For example, if dimensioning data has been obtained from two perpendicular faces, the device 104 may determine that the dimensioning operation may be completed. In other examples, the device 104 may receive an input from a user that only one perpendicular face is to be dimensioned, for example if the object 108 is a substantially flat object, such as a letter or envelope or similar.

If the determination at block 630 is negative, that is, only one perpendicular face has been dimensioned, and the device 104 has received no indication from the user of completion, then the device 104 proceeds to block 635. At block 635, the device 104 may prompt the user to align the second face perpendicular to the principal axis. For example, the device 104 may display a prompt, provide an audio indication, or similar. In some examples, the device 104 may wait for a confirmation from the user that the second face is ready for dimensioning before returning to block 610 to facilitate aligning the second face perpendicular to the principal axis 120.

If the determination at block 630 is affirmative, then the device 104 proceeds to block 640. At block 640, the device 104 is configured to determine dimensions for the object. In particular, each face presented perpendicular to the principal axis 120 allows the object to be dimensioned along two axes. When two faces are presented, the device 104 may expect one axis from each face to be common, and hence may identify the dimensions with the least difference as being along the same axis of the object 108. In some examples, when the closest dimensions are outside a threshold similarity, the device 104 may identify an error condition.

Upon determining the dimensions at block 640 or block 325, the device 104 may store the dimensions of the object in the repository 220, present the dimensions at the display of the dimensioning device 104, send the dimensions to the server 124 for further storage or processing, or similar.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A dimensioning device comprising:
- a depth sensor configured to obtain depth data within a field of view;
- a processor interconnected with the depth sensor, the processor configured to:
  - obtain depth data within the field of view including an object to be dimensioned;
  - obtain a subset of the depth data from a predefined target region within the field of view;
  - select a dimensioning function for the object, the dimensioning function having a target orientation of the object;
  - validate the target orientation of the object based on the subset of the depth data in the predefined target region; and
  - when the target orientation is validated, apply the dimensioning function to obtain dimensions of the object;
  - wherein the dimensioning function comprises a perpendicular-face approach, and wherein the target orientation includes an orientation of a surface perpendicular to a principal axis of the depth sensor; and
  - wherein to apply the dimensioning function, the processor is configured to:
    - obtain first depth data of a first surface of the object when the first surface is perpendicular to the principal axis;
    - obtain second depth data of a second surface of the object when the second surface is perpendicular to the principal axis; and
    - determine the dimensions of the object based on the first depth data and the second depth data.

2. The dimensioning device of claim 1, wherein the processor is configured to select the dimensioning function for the object by:
- detecting an element of the object in the target region; and
- selecting the dimensioning function based on the detected element of the object.

3. The dimensioning device of claim 1, wherein the processor is further configured to display a region indicator representing the target region at a display of the dimensioning device.

4. The dimensioning device of claim 1, wherein the processor is configured to:
- determine an angle of the surface relative to the principal axis of the depth sensor; and
- display an alignment indicator at a display of the dimensioning device based on the determined angle.

5. The dimensioning device of claim 4, wherein the alignment indicator is offset from an indicator of the target region based on the determined angle.

6. The dimensioning device of claim 1, wherein the dimensioning function comprises a two-sided perspective approach, and wherein the target orientation of the object results in a perspective view including two sides of the object.

7. The dimensioning device of claim 1, wherein the dimensioning function comprises a three-sided perspective approach, and wherein the target orientation of the object results in a perspective view including three sides of the object.

8. A method comprising:
- obtaining depth data within a field of view including an object to be dimensioned;
- obtaining a subset of the depth data from a predefined target region within the field of view;
- selecting a dimensioning function for the object, the dimensioning function having a target orientation of the object;
- validating the target orientation of the object based on the subset of the depth data in the predefined target region; and
- when the target orientation is validated, applying the dimensioning function to obtain dimensions of the object;
- wherein the dimensioning function comprises a perpendicular-face approach, and wherein the target orientation includes an orientation of a surface perpendicular to a principal axis of a depth sensor of a dimensioning device configured to dimension the object; and
- wherein applying the dimensioning function comprises:
  - obtaining first depth data of a first surface of the object when the first surface is perpendicular to the principal axis;
  - obtaining second depth data of a second surface of the object when the second surface is perpendicular to the principal axis; and
  - determining the dimensions of the object based on the first depth data and the second depth data.

9. The method of claim 8, comprising selecting the dimensioning function for the object by:

detecting an element of the object in the target region; and selecting the dimensioning function based on the detected element of the object.

10. The method of claim 8, further comprising displaying a region indicator representing the target region at a dimensioning device configured to dimension the object.

11. The method of claim 8, further comprising:

determining an angle of the surface relative to the principal axis of the depth sensor; and displaying an alignment indicator at the dimensioning device based on the determined angle.

12. The method of claim 11, further comprising offsetting the alignment indicator from an indicator of the target region based on the determined angle.

13. The method of claim 8, wherein the dimensioning function comprises a two-sided perspective approach, and wherein the target orientation of the object results in a perspective view including two sides of the object.

14. The method of claim 8, wherein the dimensioning function comprises a three-sided perspective approach, and wherein the target orientation of the object results in a perspective view including three sides of the object.

15. A non-transitory computer-readable storage medium storing instructions thereon, which when executed configure a processor to:

obtain depth data within a field of view including an object to be dimensioned;

obtain a subset of the depth data from a predefined target region within the field of view;

select a dimensioning function for the object, the dimensioning function having a target orientation of the object;

validate the target orientation of the object based on the subset of the depth data in the predefined target region; and when the target orientation is validated, apply the dimensioning function to obtain dimensions of the object;

wherein the dimensioning function comprises a perpendicular-face approach, and wherein the target orientation includes an orientation of a surface perpendicular to a principal axis of the depth sensor; and wherein to apply the dimensioning function, the processor is configured to:

obtain first depth data of a first surface of the object when the first surface is perpendicular to the principal axis;

obtain second depth data of a second surface of the object when the second surface is perpendicular to the principal axis; and determine the dimensions of the object based on the first depth data and the second depth data.

16. The non-transitory computer-readable storage medium of claim 15, wherein the instructions further configure the processor to:

segment the depth data and discard segments of the depth data outside the predefined target region; and apply the dimensioning function a segment of the depth data originating in the predefined target region.

* * * * *